Nov. 25, 1952     S. L. TROY     2,619,254
PRESSURE COOKER
Filed July 22, 1947     2 SHEETS—SHEET 1
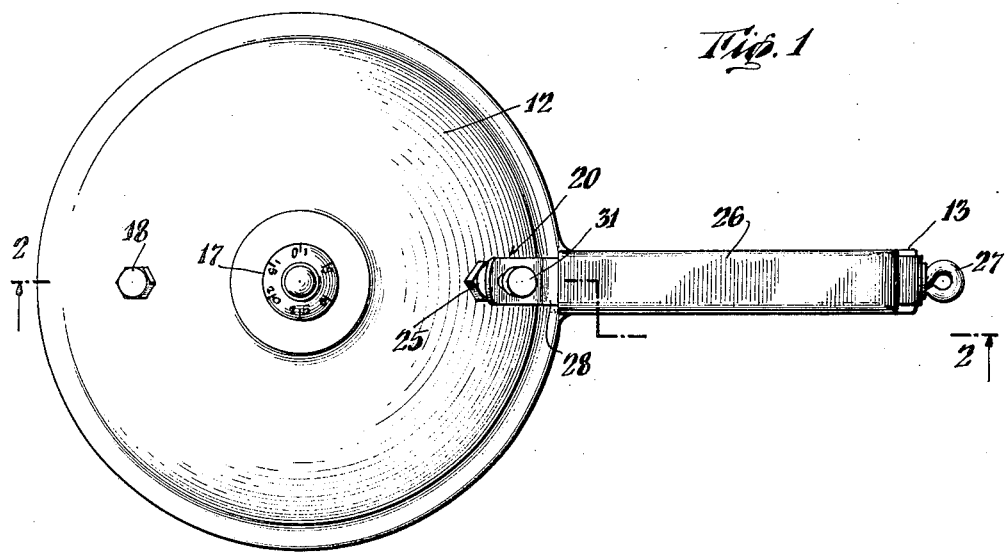
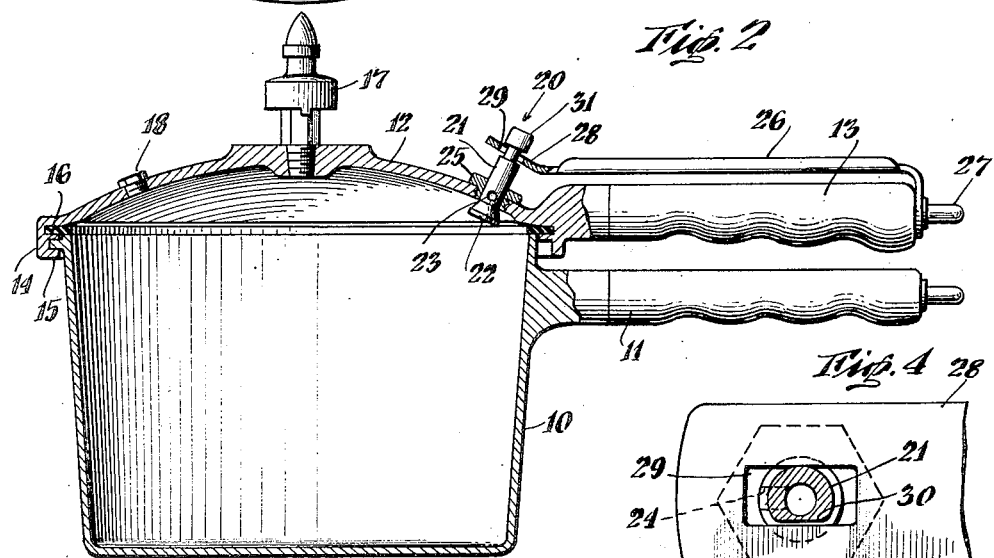
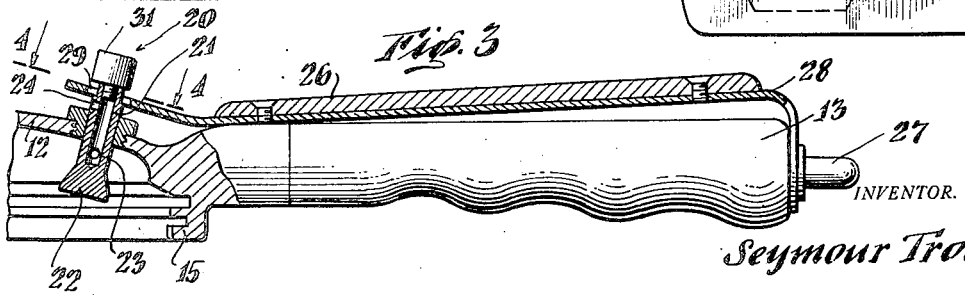
INVENTOR.
Seymour Troy
BY Duell & Kane
ATTORNEYS

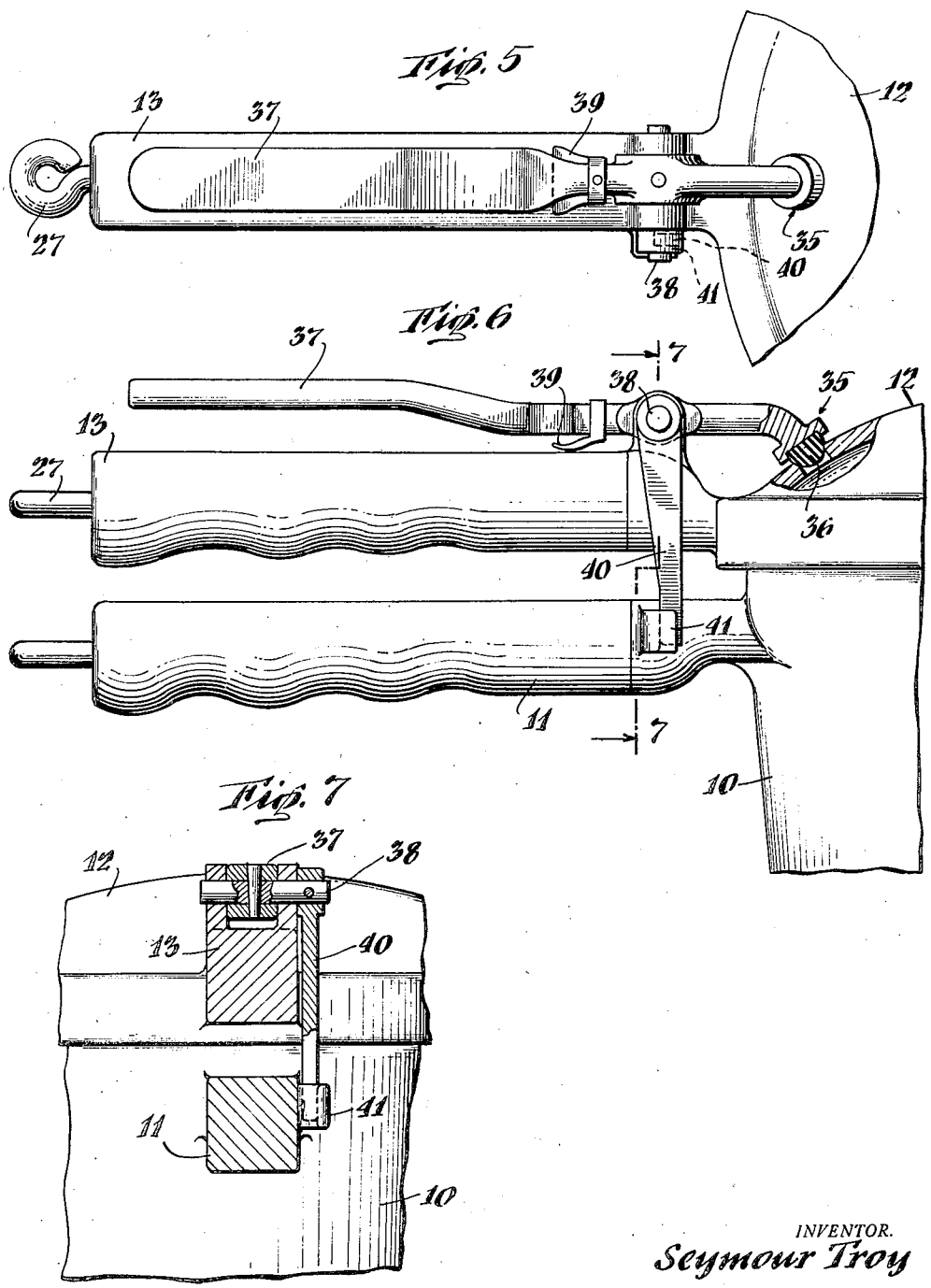

Patented Nov. 25, 1952

2,619,254

UNITED STATES PATENT OFFICE 2,619,254

PRESSURE COOKER

Seymour L. Troy, Mount Vernon, N. Y., assignor to Eastern Metal Products Co., Tuckahoe, N. Y., a partnership Application July 22, 1947, Serial No. 762,630

1 Claim. (Cl. 220—40)

This invention relates to an improved pressure release valve for pressure cookers.

The advantages in using pressure cookers for preparing food are well recognized. Thus, among other things they decrease the time required for preparing food. Also, because of the shorter period of time during which the food is subjected to heat the flavor and food value thereof are better preserved. However, many of the popular types of pressure cookers now in use have disadvantages which prevent their fullest possible use. Thus, the cover of the cooker can and sometimes is removed before the pressure inside the cooker has been fully reduced to atmospheric pressure with the result that an accident resembling an explosion occurs causing injury to the operator and damage to property due to the spraying of food particles around the room. In addition to the real safety hazard thus presented there is a psychological hazard which prevents many housewives from using pressure cookers due to this potential danger.

In addition to the real and psychological hazard there is the further disadvantage that in many types of pressure cookers it is necessary to immerse the cooker in cool water in order to fully reduce the pressure. This is a nuisance and consumes time and further discourages the use of pressure cookers. Also, if the cooling of the cooker is inadequate, the contained pressure still remains above atmospheric, with the attendant dangers heretofore mentioned.

It is a prime object of the present invention to overcome the above outlined disadvantages and to provide a pressure release valve whereby the pressure inside the cooker can be readily reduced prior to removing the cover. In this connection the operation of the valve is controlled from a safe cool zone and in a convenient manner so that when the handle of the cover or cooker is grasped to remove the cover the pressure can be reduced.

Another object is the provision of a pressure release valve for pressure cookers of the above general character which provides for controlled pressure reduction. In this connection, the operator may readily open or close the valve at will.

It is a further object of the invention to provide a pressure cooker safety release valve in which the valve body exposed inside the cooker is arranged in such a manner that the valve opening is shielded from food particles so that it will not become clogged.

In the accompanying drawings—

Fig. 1 is a top plan view of a pressure cooker embodying my invention;

Fig. 2 is a sectional view in the direction of the arrows on the line 2—2 of Fig. 1 showing my improved pressure release valve in closed position;

Fig. 3 is a detailed sectional view showing the pressure release valve operating handle and associated mechanism with the valve in open position;

Fig. 4 is a detailed view in the direction of the arrows on the line 4—4 of Fig. 3 showing the connection between control handle and valve;

Fig. 5 is a detailed plan view showing the handle and associated portions of a pressure cooker with a modified form of pressure release valve;

Fig. 6 is a side elevational view partially in sections of the structure shown in Fig. 5; and Fig. 7 is a sectional view in the direction of the arrows on the line 7—7 of Fig. 6.

My invention is applicable to most standard types of pressure cookers particularly those types in which the cover is retained on the cooker by inter-engaging cams or lugs and the cover is applied and removed by rotation thereof in opposite directions.

In the accompanying drawings I have shown my invention applied to one standard type of pressure cooker consisting of a receptacle 10 with a radially projecting handle 11 and having a cover 12, with a similar radial handle 13 applied thereto.

The cover is provided with a depending apron 14 with spaced inturned lugs 15 which inter-engage with similar lugs projecting outwardly near the upper rim of the receptacle. A gasket 16 made of rubber or other suitable sealing material is provided inside the cover so as to press against and form sealing engagement with the upper surface of the receptacle when the cover is applied thereto.

The cover is applied to the receptacle in the usual manner by resting the cover on the top of the cooker with the handle on the cover spaced a short distance in a counter-clockwise direction from the handle on the receptacle. The cover is then rotated to bring its handle in superimposed relationship with the handle on the receptacle, with the result that the lugs on the cover and receptacle are interengaged and the cover has sealing engagement with the cooker.

Suitable adjustable pressure control means such as the adjustable valve 17 may be associated with the cover, as may also a safety plug 18 which will release when the pressure inside the cooker reaches a predetermined danger point.

The mechanism so far described constitutes one standard type of pressure cooker to which my invention is applicable but it should be understood that it is equally applicable to other similar types of cookers. My invention relates to the pressure release valve assembly indicated generally at 20. This valve assembly consists of a valve member having a tubular valve stem 21 terminating in an enlarged valve body 22 which connects with the valve stem by means of an inverted tapered portion. The tapered portion of the valve body may be made of rubber or other suitable material to insure sealing engagement when the valve is closed.

Shortly above the valve body, the valve stem is provided with laterally opening apertures 23 communicating with the duct inside the tubular valve stem 21. Adjacent its upper end, the tubular valve stem is provided with an opening 24 which faces in a direction opposite to the handle 13. The valve is supported in a plug 25 threaded into an opening drilled and tapped in cover 12 a short distance radially inwardly from the handle 13.

When the valve is in its uppermost position shown in Fig. 2, valve body 22 is in sealing engagement with the lower end of plug 25 with the result that the valve is closed. When the valve is lowered to the position indicated in Fig. 3, the valve is open and communication is provided between the interior of the pressure cooker and the atmosphere. Such connection is through apertures 23 the tubular interior of valve stem 21 and aperture 24.

The valve can be controlled and manipulated by means of a suitable handle disposed in a safe, cool zone. Thus, I provide a handle in the form of a lever 26 connected at its outer end through eyebolt 27 to handle 13. In this connection the handle is mounted upon a spring metal strip 28 which normally serves to elevate the inner end of handle 26 and valve 20 to its uppermost position. At its inner end, strip 28 of the handle is provided with a slotted opening 29 which embraces neck 30 of valve stem 21. In this connection neck 30 is non-circular in shape so that it is retained by the slotted opening against rotation. A cap 31 is threaded to the upper end of neck 30 to retain the handle and valve assembly in connected relationship.

As previously stated, spring metal strip 28 is so formed as to normally retain the valve in the closed position shown in Fig. 2. Where it is desired to open the pressure release valve it is merely necessary to grasp the handle in the hand and press the handle member 26 downwardly as shown in Fig. 3 with the result that communication is provided between the interior of the cooker and the atmosphere. In this connection, I wish to point out that the opening 24 faces away from the handles with the result that steam, hot vapors or gases are discharged in a direction away from the operator.

In using a pressure cooker embodying my improved pressure release valve, the food is placed in the cooker and the cover applied thereto in the usual manner. The valve 17 is adjusted to the proper pressure and heat is applied to the cooker also in the usual manner. When the cooking operation is completed or when, for any other reason, it is desired to open the cooker the handles are grasped by the operator with the natural result that handle 26 is pressed downwardly to the position shown in Fig. 3 and the pressure inside the cooker decreases to atmospheric pressure. Accordingly, there is no danger of the cover being removed prior to reduction of the pressure inside the cooker.

The operation of the valve is readily controlled by the operator so that if he wishes to discontinue the evacuation of the cooker he may release the handle and the valve will immediately close. Also, the valve body 22 serves as a shield to protect the apertures 23 from being clogged by the contents of the cooker. This is due to the fact that the valve body flares outwardly circumferentially beyond the exterior of the valve stem at a point beneath the apertures 23. It should be noted that the control handle 26 for operating the valve is located in a cool zone to the side of the cooker and that the aperture 24 discharges away from the handle thus providing for the protection of the operator.

The pressure release valve not only provides additional safety by permitting the reduction of the pressure inside the cooker to atmospheric pressure prior to opening, but also greatly adds to the convenience of using the cooker. Thus, where a number of different items of food are being prepared in the cooker, each requiring different lengths of time, it is common practice to open the cooker from time to time to add additional items. My improved pressure release valve facilitates this operation by permitting the quick reduction of the pressure inside the cooker so that the cover can be removed.

It will be seen that the valve assembly and its operating handle form a separate unit which may be applied to most standard pressure cookers. This is accomplished by drilling and tapping the cover in the manner shown inserting plug 25 and thereafter applying the valve assembly and handle.

In the arrangement shown in the first 4 figures of the drawing the valve opens inwardly. It will be appreciated that the valve may be arranged so as to open in an outward direction. Thus, in Figs. 5–7 I have shown a pressure cooker 10 and cover 12 of similar construction to that shown in the first form of my invention. However, the pressure release valve consists of a valve assembly 35 in the form of a generally hemispherical valve body 36 engageable at the exterior of the cover with an aperture formed therein a short distance radially inwardly from the end of the handle 13.

The valve 36 is carried on the end of lever 37 pivoted at 38 to brackets supported on handle 13. The handle portion of lever 37 is disposed above the handle 13 and is normally held in elevated position by a small spring 39. When the handle portion of the lever is in elevated position, valve 36 closes the aperture in the cover in the manner shown in Fig. 6. By pressing the handle downwardly against the force of spring 39, the valve opens, providing for communication between the interior of the cooker and the atmosphere. The tension of spring 39 may be so arranged that valve 36 serves as an automatic safety valve or as a pressure control valve to open when the pressure in the cooker reaches a predetermined level.

In normal use and operation the valve assembly 35 is employed in a similar manner to the valve assembly 20. In either form of my invention I may provide the valve assembly with an additional safety feature which will prevent the cover from being removed from the cooker until the valve has been opened. A specific arrangement of this type is shown in Figs. 5 to 7 and comprises an arm 40 keyed to the pivot 38 which in turn is keyed to lever 37 as shown in Fig. 7. The arm extends downwardly to a point adjacent handle 11 and when the cover is in closed position the arm will engage with a catch 41 provided at the side of the handle.

When the cover has been applied to the cooker in the manner shown and arm 40 is engaged with catch 41, cover 12 cannot be rotated to open it without first depressing lever 37 causing arm 40 to release from catch 41. This feature requires the opening of the valve and the reduction of the pressure in the cooker before the cover can be removed. An arrangement similar to this may also be used in the first form of my invention.

From the foregoing it will be appreciated that I have provided an improved pressure release valve for pressure cookers whereby the pressure inside the cooker can be readily reduced prior to removing the cover. Also, that the valve is controlled by a handle located in a cool, safe zone and the hot vapors, gases or steam are discharged in a direction away from the operator. It will also be seen that my valve provides for controlled pressure reduction and that the valve can be opened or closed by the operator at will. It will also be seen that in the first form of my invention the openings in the valve are shielded and protected by the valve body from the contents of the cooker.

Modifications may be made in the illustrated embodiment of my invention without departing from the invention as set forth in the accompanying claim.

I claim:

In a pressure cooker in combination a receptacle body, a cover therefor, a coupling structure for maintaining said cover upon said receptacle for sealing the interior of the latter, a pair of handles secured against movement and extending laterally and respectively from said receptacle and cover, said handles being shiftable with respect to each other around the axis of said cooker to a point where they are in substantial vertical alignment to render said coupling structure operative, said cover being formed with an opening, a manually operated pressure release valve projectible inwardly of said receptacle to control the escape of steam under pressure from within said receptacle through said opening, said valve comprising a body having its inner end enlarged and extending into said cooker, said body being formed with a bore terminating in an intake orifice short of said enlarged end, the opposite end of said bore communicating with the atmosphere and a valve operating lever pivotally mounted above and by the cover handle and connected to said valve, whereby when said lever is swung towards the upper surface of the cover handle said valve will be projected.

SEYMOUR L. TROY.

REFERENCES CITED

The following references are of record in the file of this patent:

UNITED STATES PATENTS

| Number | Name | Date |
|---|---|---|
| 617,880 | Kuster | Jan. 17, 1899 |
| 844,272 | Fate | Feb. 12, 1907 |
| 1,241,010 | Paquette | Sept. 25, 1917 |
| 1,418,530 | Burnham | June 6, 1922 |
| 2,250,709 | Hummel | July 29, 1941 |
| 2,308,320 | Stephens | Jan. 12, 1943 |
| 2,396,233 | Abrams | Mar. 12, 1946 |
| 2,429,149 | Wittenberg | Oct. 14, 1947 |
| 2,436,566 | Goldberg | Feb. 24, 1948 |
| 2,468,259 | Foster | Apr. 28, 1949 |
| 2,483,297 | Naylor | Sept. 27, 1949 |

FOREIGN PATENTS

| Number | Country | Date |
|---|---|---|
| 20,630 | Great Britain | 1895 |
| 335,425 | Italy | Feb. 5, 1936 |
| 486,183 | Great Britain | May 31, 1938 |